United States Patent
Nakamura

(10) Patent No.: US 6,646,792 B2
(45) Date of Patent: Nov. 11, 2003

(54) LIGHT AMPLIFIER AND LIGHT TRANSMISSION SYSTEM USING THE SAME

(75) Inventor: Keiji Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/167,443

(22) Filed: Jun. 13, 2002

(65) Prior Publication Data

US 2003/0090785 A1 May 15, 2003

(30) Foreign Application Priority Data

Jun. 13, 2001 (JP) ........................................ 2001-177850

(51) Int. Cl.[7] ................................................ H01S 3/00
(52) U.S. Cl. .................................. 359/341.42; 359/337
(58) Field of Search ............................. 359/341.42, 337

(56) References Cited

U.S. PATENT DOCUMENTS 6,144,487 A  * 11/2000  Michishita ................... 359/341
6,456,428 B1 *  9/2002  Nakaji et al. ........... 359/341.41
2003/0090785 A1 * 5/2003 Nakamura .................. 359/349

FOREIGN PATENT DOCUMENTS

JP          409185092 A  *  7/1997

* cited by examiner

Primary Examiner—Mark Hellner
(74) Attorney, Agent, or Firm—Young & Thompson

(57) ABSTRACT

An optical output signal of an optical amplifier 1 branched by an optical divider/splitter 2 is separated by an optical demultiplexor 3 into different paths □1 to □n in accordance with the wavelength, and the level of each different wavelength component is adjusted under the control of an optical attenuator control circuit 9 on the basis of a transmission wavelength information notified through a transmission wavelength information input terminal 14. At this time, in the path corresponding to the wavelength transmitted, the attenuation amount of an optical attenuator is controlled to a minimum level, and in the path corresponding to the wavelength other than the wavelength transmitted, the attenuation amount of an optical attenuator is controlled to a maximum level. After the level adjustment, the different wavelength components are combined by an optical multiplexor 5, and the level of the combined signal is detected by a photo diode 6.

12 Claims, 4 Drawing Sheets

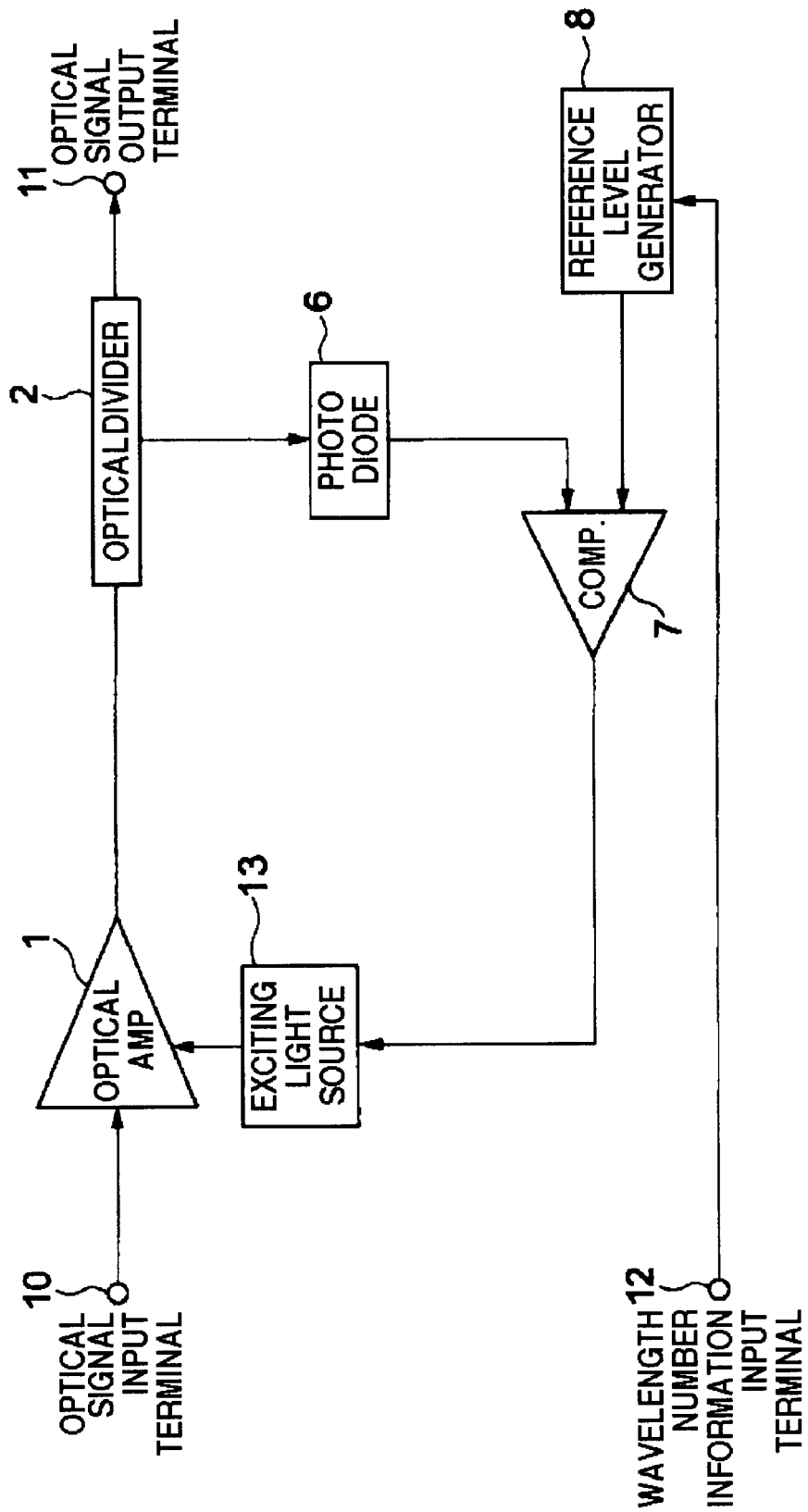
Fig. 4 *Prior Art*

LIGHT AMPLIFIER AND LIGHT TRANSMISSION SYSTEM USING THE SAME

BACKGROUND OF THE INVENTION

The present invention relates to a light amplifier and a light transmission system using the same, and more specifically to a light amplifier for a wavelength division multiplexing optical signal, so configured to control an amplification level in accordance with the result of the comparison of a predetermined level with the level of a signal partially branched from an amplified optical signal, and a light transmission system using the same.

In a wavelength division multiplexing (abbreviated to "WDM") transmission system using an optical fiber amplifier, it is necessary to stably transmit a wavelength division multiplexing optical signal over a long distance. Generally, each optical fiber amplifier used in the wavelength division multiplexing transmission system is configured to output an optical signal having a constant level for each wavelength.

In the conventional optical fiber amplifier used in the wavelength division multiplexing transmission system, the amplification level of the light amplifier is controlled in such a manner that a portion of the output signal of the light amplifier is branched so that the level of the optical output signal is detected by a photo diode (abbreviated to "PD"), and an automatic power control (abbreviated to "APC") is carried out to maintain the level of the optical output signal at a constant.

The construction of the conventional optical fiber amplifier mentioned above is illustrated in FIG. 4. In FIG. 1, the reference number 1 designates an optical amplifier, and the reference number 2 indicates an optical divider/splitter. The reference number 6 denotes a photo diode, and the reference number 7 shows a comparator. The reference number 8 denotes a reference level generator, and the reference number 13 indicates an exciting light source. In addition, the reference number 10 denotes an optical signal input terminal, and the reference number 11 shows an optical signal output terminal. The reference number 12 designates a wavelength number information input terminal, which receives an actually transmitted wavelength number information through a monitoring and controlling line from a not-shown terminal station. Incidentally, the optical amplifier 1 is an erbium doped fiber amplifier (abbreviated to "EDFA").

In the optical fiber amplifier shown in FIG. 4, the wavelength division multiplexing optical signal inputted to the optical signal input terminal 10 is amplified to a predetermined level by action of the optical amplifier 1, and then, a portion of the optical output signal of the optical amplifier 1 is branched by action of the optical divider/splitter 2, and the level of the optical output signal is detected by the photo diode 6. The comparator 7 compares the detected level with a reference level which is generated in the reference level generator 8 in accordance with the wavelength number of the wavelength division multiplexing optical signal supplied from the wavelength number information input terminal 12. On the basis of the result of this comparison, the level of the exciting light generated by the exciting light source 13 is controlled, with the result that the APC control is carried out to maintain the level of the optical output signal of the optical amplifier 1 at a constant, and therefore, the amplification level of the light amplifier is controlled.

In the conventional optical fiber amplifier, namely, since the level of the optical output signal outputted from the light amplifier is different dependently upon the wavelength number of a multiplexed optical signal, the transmitted wavelength number information is notified to the reference level generator 8, and the detected level of the optical output signal is compared with the reference level corresponding to the wavelength number by action of the comparator 7, so that level of the optical output signal per one wavelength is controlled to be maintained at a constant.

In addition, Japanese Patent Application Pre-examination Publication No. JP-A-10-51388 discloses another conventional light amplification device. This is so configured that a portion of the optical output signal of the light amplifier is branched into two paths, in one of which the level of the branched optical output signal is measured, and in the other of which the level of an optical signal (amplified spontaneous emission, abbreviated to "ASE") obtained by removing a desired wavelength component from the optical output signal, is measured. Further, the amplification level of the light amplifier is controlled on the basis of a control signal (a signal of the desired wavelength component) obtained by subtracting the signal level of the other branched path from the signal level of the one branched path.

As mentioned above, on the other hand, since the wavelength division multiplexing transmission system using the optical fiber amplifier is required to stably transmit the wavelength division multiplexing optical signal over a long distance. A optical fiber which is a transmission line, involves a loss, and therefore, in order to stably transmit the optical signal over a long distance, it is necessary to compensate for the transmission loss in the optical fiber. For this purpose, a number of low-noise optical fiber amplifiers are located on the way of the optical fiber transmission path. The optical fiber amplifier amplifies the optical signal to a predetermined optical signal level and sends the amplified signal to the optical fiber transmission line. By repeating this operation, the long-distance light transmission is ensured.

However, in the above mentioned conventional optical fiber amplifier of the APC control, since the level of the optical output signal outputted from the optical fiber amplifier is different dependently upon the number of the wavelengths transmitted in a multiplexed manner, the control is carried out to maintain the level of the optical output signal per one wavelength in accordance with the transmitted wavelength number information. Therefore, the level of the ASE light generated in the light amplifier also changes with the change of the level of the optical output signal. On the other hand, since the range of the wavelength detectable to the photo diode for detecting the optical output signal is wide, the photo diode cannot discriminate how much the detected optical signal contains the ASE light. Accordingly, a problem is encountered in that the degree of deterioration of the optical output signal caused by the ASE light greatly changes dependently upon the number of wavelengths transmitted. In other words, the larger the number of the wavelengths transmitted is, the influence of the ASE light to the optical output signal is small, and the smaller the number of the wavelengths transmitted is, the influence of the ASE light to the optical output signal becomes remarkable.

In addition, since the light amplification device disclosed in JP-A-10-51388 mentioned above is targeted for the optical signal of a certain specific wavelength, when a multiplexed optical signal is inputted, it is impossible to measure the level of the ASE light of the other path mentioned above in a high fidelity. Furthermore, since the multiplexed optical signal is outputted without modification in the one path mentioned above, it is impossible to precisely grasp the level of the optical output signal of the light amplifier. As a result, a problem is encountered in that the amplification level of the light amplifier cannot be controlled.

Moreover, in the wavelength division multiplexing transmission system using the conventional optical fiber amplifier, a problem does not occur in the case that a number of wavelengths are transmitted, since the level of the optical output signal is sufficiently larger than the level of the ASE light. However, at the beginning of the introduction of a system, the number of wavelengths transmitted is small and becomes one in a certain case. In such a situation, the level of the optical output signal drops because of the influence of the ASE light generated in the light amplifier. In this case, if a number of optical fiber amplifiers are arranged in a multi-stage structure, a problem will rise in which the ASE light is accumulated so that the optical output signal becomes buried in the ASE light, with the result that the level of the optical output signal drops.

FIG. 3A illustrates the change of the level of the ASE light in comparison with the optical output signal when a single wavelength is transmitted through a number of optical fiber amplifiers arranged in a multi-stage structure. As seen from FIG. 3A, if the number of repeaters is increased from one stage, to two stages, . . . , to (K−1) stages, to K stages (where "K" is a natural number), the ASE light is accumulated to have an increased level, with the result that the optical output signal becomes buried in the ASE light and the level of the optical output signal gradually drops.

If the level of the optical output signal drops, the signal-to-noise ratio (abbreviated to "SNR") of the optical signal resultantly deteriorates, resulting in a quality deterioration of the line. Accordingly, in the wavelength division multiplexing transmission system using the conventional optical fiber amplifier, a transmissible minimum wavelength number and a quality-warrantable transmission distance have their limits.

BRIEF SUMMARY OF THE INVENTION

Accordingly, the present invention was made to overcome the above mentioned problems of the prior art.

An object of the present invention is to provide a light amplifier capable of preventing the deterioration of the optical output signal caused by the ASE light at the time of amplifying a multiplexed optical signal, so as to precisely control the amplification level of the light amplifier, and capable of preventing the level drop of the optical output signal even in the case that the number of wavelengths transmitted is one, so that a long-distance transmission having a good line quality can be realized, and a light transmission system using the same.

According to the present invention, there is provided a light amplification device which includes a light amplification means for amplifying a wavelength division multiplexing optical signal to output an amplified optical signal, and a branch means for branching a portion of the amplified optical signal to supply a branch signal, and which is so configured that an amplification level of the light amplification means is controlled on the basis of the result of the comparison of the level of the branch signal with a predetermined level, characterized is that the light amplification device comprises an optical demultiplexing means for separating the branch signal into different wavelength components, a level adjusting means for controlling the level of the different wavelength components independently of each other, and an optical multiplexing means for combining the different wavelength components thus level-controlled, to output a combined signal, so that the amplification level of the light amplification means is controlled on the basis of the result of the comparison of the level of the combined signal with the predetermined level.

In addition, the optical demultiplexing means demultiplexes the branch signal into different paths corresponding to the different wavelength components, respectively, and the paths are provided in the number corresponding to a maximum number in the number of wavelengths transmitted in the wavelength division multiplexing optical signal.

Furthermore, the different wavelength components are level-adjusted so that the wavelength component in the path corresponding to the wavelength transmitted in the wavelength division multiplexing optical signal becomes a maximum level and the wavelength component in the path corresponding to the wavelength other than the wavelength transmitted becomes a minimum level.

In addition, the optical demultiplexing means is constituted of an arrayed waveguide grating, and the optical multiplexing means is constituted of an arrayed waveguide grating.

Moreover, according to the present invention, there is provided a light transmission system for transmitting and repeating a wavelength division multiplexing optical signal by light amplification devices connected through a transmission path in a multi-stage structure, the light transmission system comprising the above mentioned light amplification devices.

An operation of the present invention will be described. A portion of an optical output signal of an optical amplifier is branched, and is further separated by an optical demultiplexor into different paths in accordance with the wavelength. Of the different paths, in the path corresponding to the wavelength transmitted in the wavelength division multiplexing optical signal, the attenuation amount of the optical signal is controlled to a minimum level so that the level of the optical output signal is maintained as it is, and in the path corresponding to the wavelength other than the wavelength transmitted in the wavelength division multiplexing optical signal, the attenuation amount of the optical signal is controlled to a maximum level, so that the level of the ASE light is suppressed or minimized. After the level adjustment, the optical signals of the different paths are combined, and the level of the combined signal is detected. The detected level is compared with a reference level which is determined for each wavelength number, and on the basis of the result of this comparison, the exciting light level of an exciting light source is controlled. Thus, since the amplification level of the optical amplifier is controlled on the basis of the optical output signal having the suppressed or minimized ASE light, the level of the optical output signal is precisely controlled. In addition, if optical fiber amplifiers having this optical amplifier are connected in a multi-stage structure, it is possible to prevent the drop of the level of the optical output signal caused by the ASE light. Therefore, even if the number of the multiplexed wavelengths is only one, a stable long-distance transmission having a good line quality can be realized.

BRIEF DESCRIPTION OF THE DRAWINGS

FIG. 4 is a block diagram illustrating the structure of the conventional optical fiber amplifier.

DETAILED DESCRIPTION OF THE INVENTION

Figure 1:
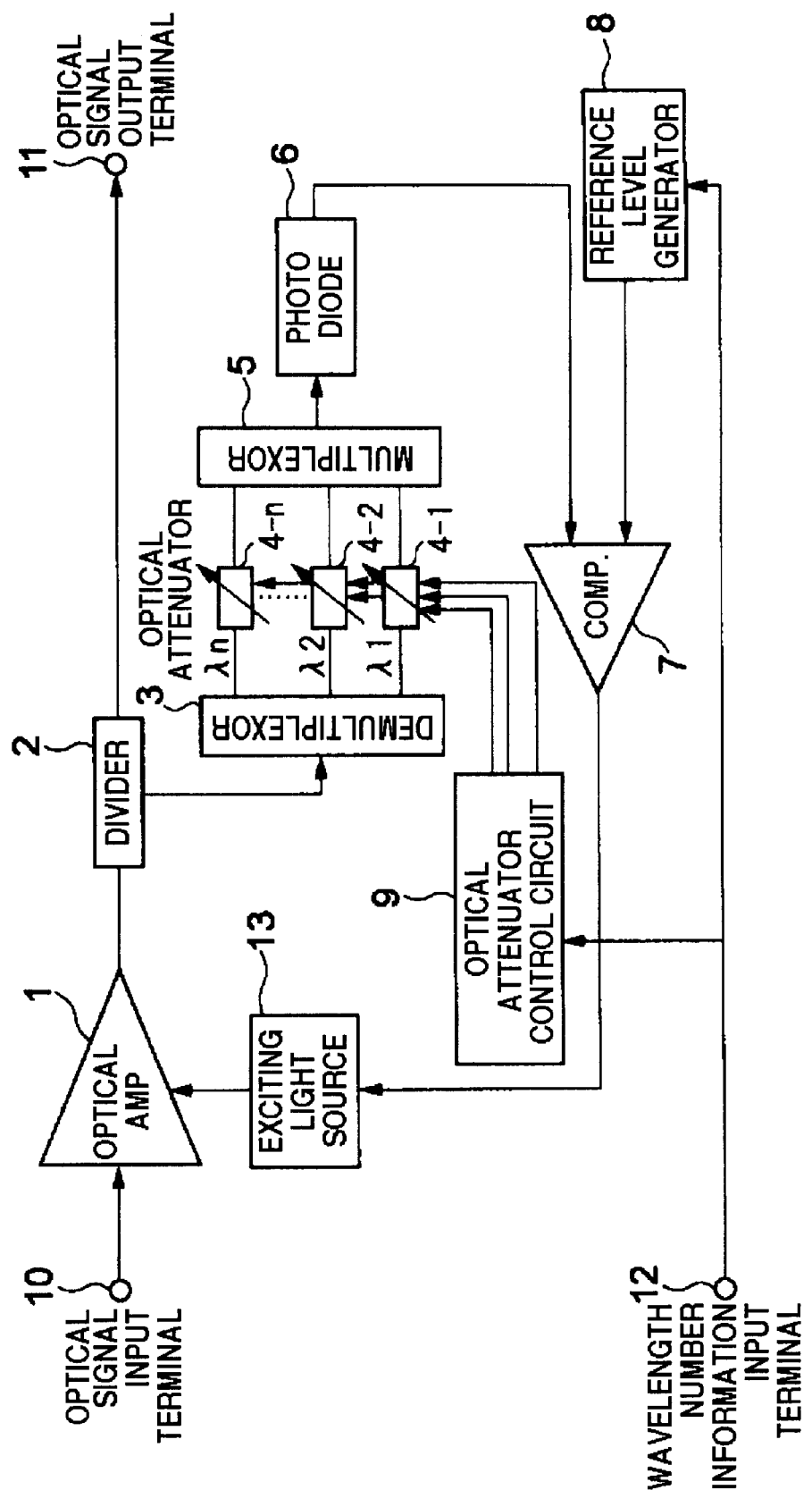
FIG. 1 is a block diagram illustrating the structure of the optical fiber amplifier of one embodiment of the present invention.

Now, embodiments of the present invention will be described with reference to the accompanying drawings. FIG. 1 is a block diagram illustrating the structure of the optical fiber amplifier of one embodiment of the present invention. In FIG. 1, the reference number 3 designates an optical wave division demultiplexor 3, and the reference numbers 4-1, 4-2, . . . , 4-n indicate an optical attenuator. The reference number 5 designates an optical multiplexor, and the reference number 9 shows an optical attenuator control circuit. The other elements similar those shown in FIG. 4 are given the same reference numbers. Incidentally, the optical demultiplexor 3 and the optical multiplexor 4 are an arrayed waveguide grating (abbreviated to "AWG"), and the optical attenuators 4-1, 4-2, . . . , 4-n are provided in the number corresponding to a maximum number of the number in wavelengths transmitted in a wavelength division multiplexing optical signal to be inputted to the optical signal input terminal 10.

Next, an operation of the optical fiber amplifier of the one embodiment of the present invention will be described with reference to FIG. 1. In FIG. 1, the wavelength division multiplexing optical signal inputted through the optical signal input terminal 10 is amplified to a predetermined amplified level by the optical amplifier 1, and the optical output signal of the optical amplifier 1 is divided by action of the optical divider/splitter 2 into two, one of which is inputted to the optical demultiplexor 3. In the optical demultiplexor 3, the optical signal is separated into different light paths in accordance with the wavelength, and in each of the different light paths, the optical signal is adjusted to a predetermined level by an optical attenuator 4-1, 4-2, . . . , 4-n provided in each different light path.

On the other hand, an actually transmitted wavelength number information supplied through a monitoring and controlling line from a not-shown terminal station is inputted through the wavelength number information input terminal 12. On the basis of this information, the optical attenuator control circuit 9 level-controls the optical attenuators 4-1, 4-2, . . . , 4-n. In this level control, the loss of the optical attenuators in the path(s) corresponding to the wavelength(s) transmitted is controlled to a minimum level, while the loss of the optical attenuators in the paths corresponding to the wavelengths other than the wavelength(s) transmitted is controlled to a maximum level.

For enabling the optical attenuator control circuit 9 to control the optical attenuators 4-1, 4-2, . . . , 4-n on the basis of the wavelength number information inputted through the wavelength number information input terminal 12, for example, when the wavelength number supplied through the wavelength number information input terminal 12 is one, the optical attenuator controlled to the minimum level is set to the optical attenuators 4-1, and the loss of the other optical attenuators 4-2, . . . , 4-n is controlled to the maximum level. In this case, if the multiplexed wavelength number increases as 2, 3, . . . , n, the optical attenuator control circuit 9 increase the number of the optical attenuators controlled to the minimum level in the order of the optical attenuators 4-2, . . . , 4-n.

Figure 2:
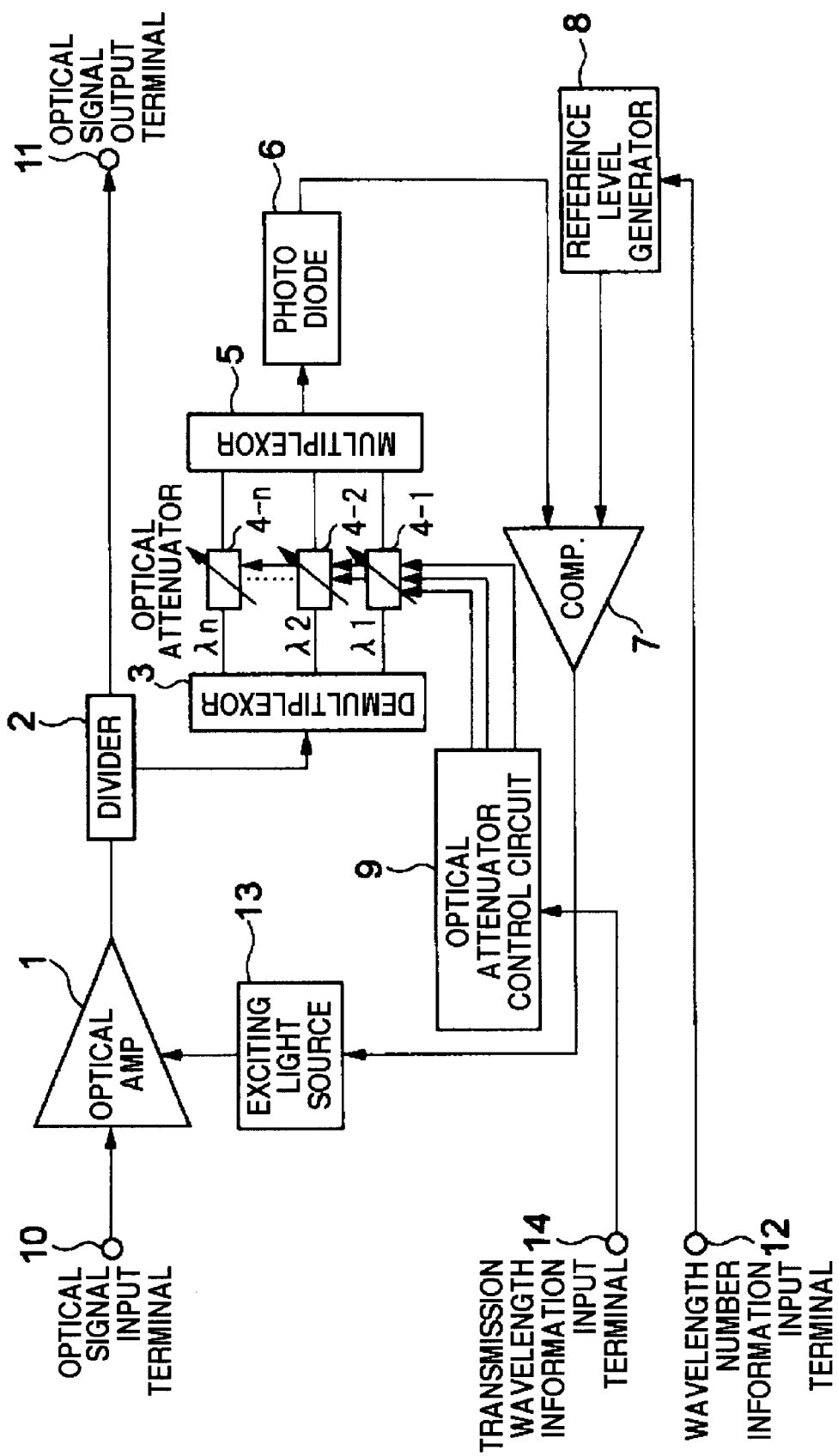
FIG. 2 is a block diagram illustrating the structure of the optical fiber amplifier of another embodiment of the present invention.

Another method for controlling the optical attenuators 4-1 to 4-n includes the controlling of the optical attenuators in the paths corresponding to the wavelengths actually transmitted. FIG. 2 is a block diagram illustrating the structure of the optical fiber amplifier of another embodiment of the present invention. The embodiment shown in FIG. 2 is different from the embodiment shown in FIG. 1 in that the information notified to the optical attenuator control circuit 9 is a wavelength information of the optical signal actually transferred, and a transmission wavelength information notified through the monitoring and controlling line from the not-shown terminal station is inputted to a transmission wavelength information input terminal 14. The other elements similar those shown in FIG. 1 are given the same reference numbers.

In this embodiment, when the transmission wavelength information inputted through the transmission wavelength information input terminal 14 indicates that the optical signal of a wavelength $\lambda 1$ is transmitted, the optical attenuator control circuit 9 controls the loss level of the optical attenuator 4-1 of the path corresponding to the wavelength $\lambda 1$, to the minimum level, and also controls the loss level of the optical attenuators 4-2 to 4-n of the paths corresponding to the other wavelengths, to the maximum level. In this case, if the wavelength of the transmitted optical signal changes, the loss level of the optical attenuator of the path corresponding to the wavelength of the transmitted optical signal is controlled to the minimum level, and the loss level of the optical attenuator of the path corresponding to the wavelength of a not-transmitted optical signal is controlled to the maximum level.

As the result of the level adjustment of the optical output signal in the embodiments of FIGS. 1 and 2, the loss level of the optical attenuator of the path corresponding to the wavelength transmitted is controlled to the minimum level, and the loss level of the optical attenuator of the paths other than the path corresponding to the wavelength transmitted is controlled to the maximum level, with the result that, in the ASE light generated by the optical amplifier 1, the level of the ASE light in a wavelength component which is not actually transmitted is suppressed or minimized.

The optical signals thus level-adjusted in the respective paths are wavelength-multiplexed or combined by the optical multiplexor 5, and thereafter, the level of the optical signal thus multiplexed is detected by the photo diode 6. The detected level is compared by the comparator 7 with a reference level which is generated by the reference level generator 8 on the basis of the wavelength number information supplied through the wavelength number information input terminal 12. The exciting light level of the exciting light source 13 is controlled in accordance with the result of this comparison, so that the APC control is realized to maintain the level of the optical output signal of the optical amplifier 1 at a constant. Thus, the amplification level of the light amplifier is controlled.

With the above mentioned arrangement, when the multiplexed optical signal is amplified, the amplification level of the light amplifier is controlled on the basis of the level of the optical output signal having the reduced ASE light level, with the result that the amplification level of the light amplifier can be precisely controlled, and therefore, the optical output signal of the APC-controlled light amplifier has a reduced ASE light level. In addition, when a number of optical fiber amplifiers each having this optical amplifier are connected in a multi-stage structure, it is possible to prevent the drop of the optical output signal caused by the ASE light, and therefore, the SNR of the optical signal can be maintained in a good condition.

Figure 3A:
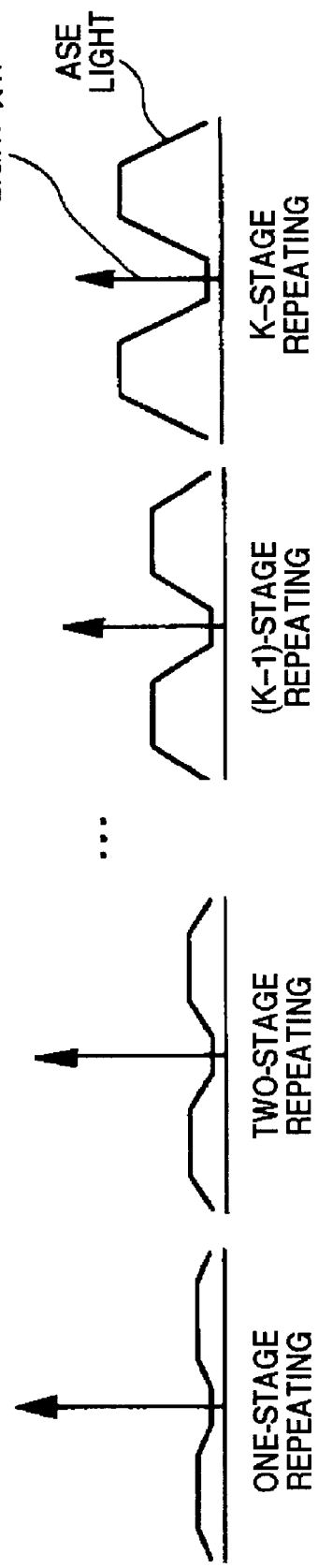
FIG. 3A is a chart comparing the level of the ASE light with the optical output signal when a number of conventional optical fiber amplifiers are arranged in a multi-stage structure.
Figure 3B:
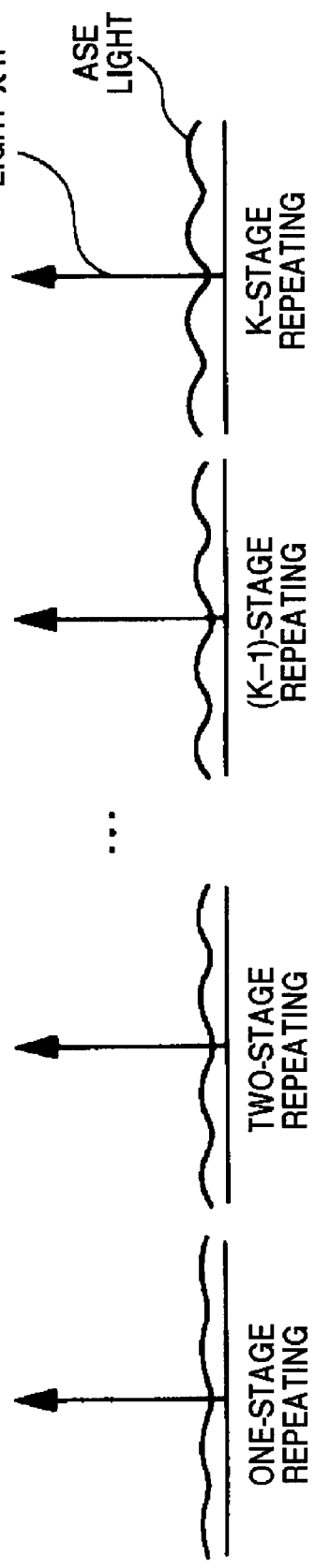
FIG. 3B is a chart comparing the level of the ASE light with the optical output signal when a number of optical fiber amplifiers in accordance with the present invention are arranged in a multi-stage structure.

FIG. 3B illustrates the change of the level of the ASE light in comparison with the optical output signal when a single wavelength is transmitted through a number of optical fiber amplifiers of the present invention arranged in a multi-stage structure. As seen from FIG. 3B, even if the number of repeaters is increased from one stage, to two stages, . . . , to (K−1) stages, to K stages (where "K" is a natural number), the ASE light is not accumulated, with the result that the optical output signal never becomes buried in the ASE light and the level of the optical output signal does not drop. Accordingly, even if the number of the multiplexed wavelengths is only one, a stable long-distance transmission having a good line quality can be realized.

Here, it would be apparent that the present invention is in no way limited to the above mentioned embodiments, but changes and modifications may be made within the scope of the technical idea of the present invention if necessary. For example, in the above mentioned embodiments, the light amplifier is constituted of the EDFA. However, the light amplifier is in no way limited to the EDFA, but can be freely constituted of any other light amplifier which can be used as the optical fiber amplifier.

As mentioned above, according to the present invention, the signal divided from the output of the light amplifier is separated into different wavelength components, and the level of the different wavelength components are controlled to the effect that the optical signal level of the wavelength components other than the wavelength(s) transmitted in the multiplexed optical signal is minimized. Thus, the level of the ASE light generated in the light amplifier can be suppressed or minimized, with the result that the amplification level control of the optical fiber amplifier can be advantageously precisely carried out.

In addition, according to the present invention, in the wavelength division multiplexing transmission system including a number of optical fiber amplifiers each having the light amplifier of the present invention and connected in a multi-stage structure, it is possible to prevent the drop of the level of the optical output signal caused by the accumulative increase of the ASE light. Even if the number of the multiplexed wavelengths is only one, a stable long-distance transmission having a good line quality can advantageously be realized.

What is claimed is:

1. A light amplification device which includes a light amplification means for amplifying a wavelength division multiplexing optical signal to output an amplified optical signal, and a branch means for branching a portion of said amplified optical signal to supply a branch signal, and which is so configured that an amplification level of said light amplification means is controlled on the basis of the result of the comparison of the level of said branch signal with a predetermined level, the light amplification device comprising an optical demultiplexing means for separating said branch signal into different wavelength components, a level adjusting means for controlling the level of the different wavelength components independently of each other, and an optical multiplexing means for combining the different wavelength components thus level-controlled, to output a combined signal, so that the amplification level of said light amplification means is controlled on the basis of the result of comparison of the level of said combined signal with said predetermined level.

2. A light amplification device claimed in claim 1 wherein said optical demultiplexing means demultiplexes said branch signal into different paths corresponding to said different wavelength components, respectively.

3. A light amplification device claimed in claim 2 wherein said paths are provided in the number corresponding to a maximum number in the number of wavelengths transmitted in said wavelength division multiplexing optical signal.

4. A light amplification device claimed in claim 1 wherein said different wavelength components are level-adjusted so that the wavelength component in the path corresponding to the wavelength transmitted in said wavelength division multiplexing optical signal becomes a maximum level and the wavelength component in the path corresponding to the wavelength other than the wavelength transmitted becomes a minimum level.

5. A light amplification device claimed in claim 1 wherein said optical demultiplexing means is constituted of an arrayed waveguide grating.

6. A light amplification device claimed in claim 1 wherein said optical multiplexing means is constituted of an arrayed waveguide grating.

7. A light transmission system for transmitting and repeating a wavelength division multiplexing optical signal by light amplification devices connected through a transmission path in a multi-stage structure, said light amplification devices comprising:

a light amplification means for amplifying a wavelength division multiplexing optical signal to output an amplified optical signal;

a branch means for branching a portion of said amplified optical signal to supply a branch signal;

an optical demultiplexing means for separating said branch signal into different wavelength components;

a level adjusting means for controlling the level of the different wavelength components independently of each other; and an optical multiplexing means for combining the different wavelength components thus level-controlled, to output a combined signal, so that an amplification level of said light amplification means is controlled on the basis of the result of the comparison of the level of said combined signal with a predetermined level.

8. A light transmission system claimed in claim 7 wherein said optical demultiplexing means demultiplexes said branch signal into different paths corresponding to said different wavelength components, respectively.

9. A light transmission system claimed in claim 8 wherein said paths are provided in the number corresponding to a maximum number in the number of wavelengths transmitted in said wavelength division multiplexing optical signal.

10. A light transmission system claimed in claim 7 wherein said different wavelength components are level-adjusted so that the wavelength component in the path corresponding to the wavelength transmitted in said wavelength division multiplexing optical signal becomes a maximum level and the wavelength component in the path corresponding to the wavelength other than the wavelength transmitted becomes a minimum level.

11. A light transmission system claimed in claim 7 wherein said optical demultiplexing means is constituted of an arrayed waveguide grating.

12. A light transmission system claimed in claim 7 wherein said optical multiplexing means is constituted of an arrayed waveguide grating.

* * * * *